United States Patent [19] [11] Patent Number: 4,606,051
Crabtree et al. [45] Date of Patent: Aug. 12, 1986

[54] QPSK DEMODULATOR WITH I AND Q POST-DETECTION DATA CORRECTION

[75] Inventors: Steven B. Crabtree, Taft, Tenn.; Harry Yedid, Huntsville, Ala.; James B. Sherman, Chapel Hill, N.C.

[73] Assignee: Universal Data Systems, Inc., Huntsville, Ala.

[21] Appl. No.: 550,868

[22] Filed: Nov. 10, 1983

[51] Int. Cl.4 .................. H03D 3/00; H04L 27/22
[52] U.S. Cl. ......................... 375/86; 375/54; 375/102; 329/110
[58] Field of Search .................. 375/8, 9, 52, 53, 54, 375/83, 86, 85, 39, 102; 329/110, 112, 120, 135, 124, 123

[56] References Cited

U.S. PATENT DOCUMENTS

| | | | |
|---|---|---|---|
| 3,568,078 | 3/1971 | Pelchat | 329/112 |
| 3,646,546 | 2/1972 | Norris | 375/83 |
| 4,027,265 | 5/1977 | Kobayashi et al. | 375/85 |
| 4,224,575 | 9/1980 | Mosley et al. | 375/83 |
| 4,234,957 | 11/1980 | Tracey et al. | 375/86 |
| 4,313,202 | 1/1982 | Kameya | 375/9 |
| 4,320,345 | 3/1982 | Waggener | 375/83 |

FOREIGN PATENT DOCUMENTS 1281169   7/1972   United Kingdom ............... 375/54

Primary Examiner—Benedict V. Safourek
Assistant Examiner—Raymond C. Glenny
Attorney, Agent, or Firm—Weingarten, Schurgin, Gagnebin & Hayes

[57] ABSTRACT

A modem receiver having receiver control, signal detection, and data demodulation implemented with a single general-purpose integrated circuit microcomputer. Novel multirate digital signal processing techniques are included which provide complete real-time recovery of all data and modem signals in a microcomputer integrated circuit having an architecture not optimized for signal processing applications. The resulting techniques extend to more general signal processing applications which may be implemented by other general-purpose microcomputers, programmed signal processors, or specific dedicated hardware logic. The novel modem receiver includes digital FIR filters, performing quadrature signal detection, and post-demodulation data correction with an all-digital second-order carrier recovery loop.

10 Claims, 19 Drawing Figures

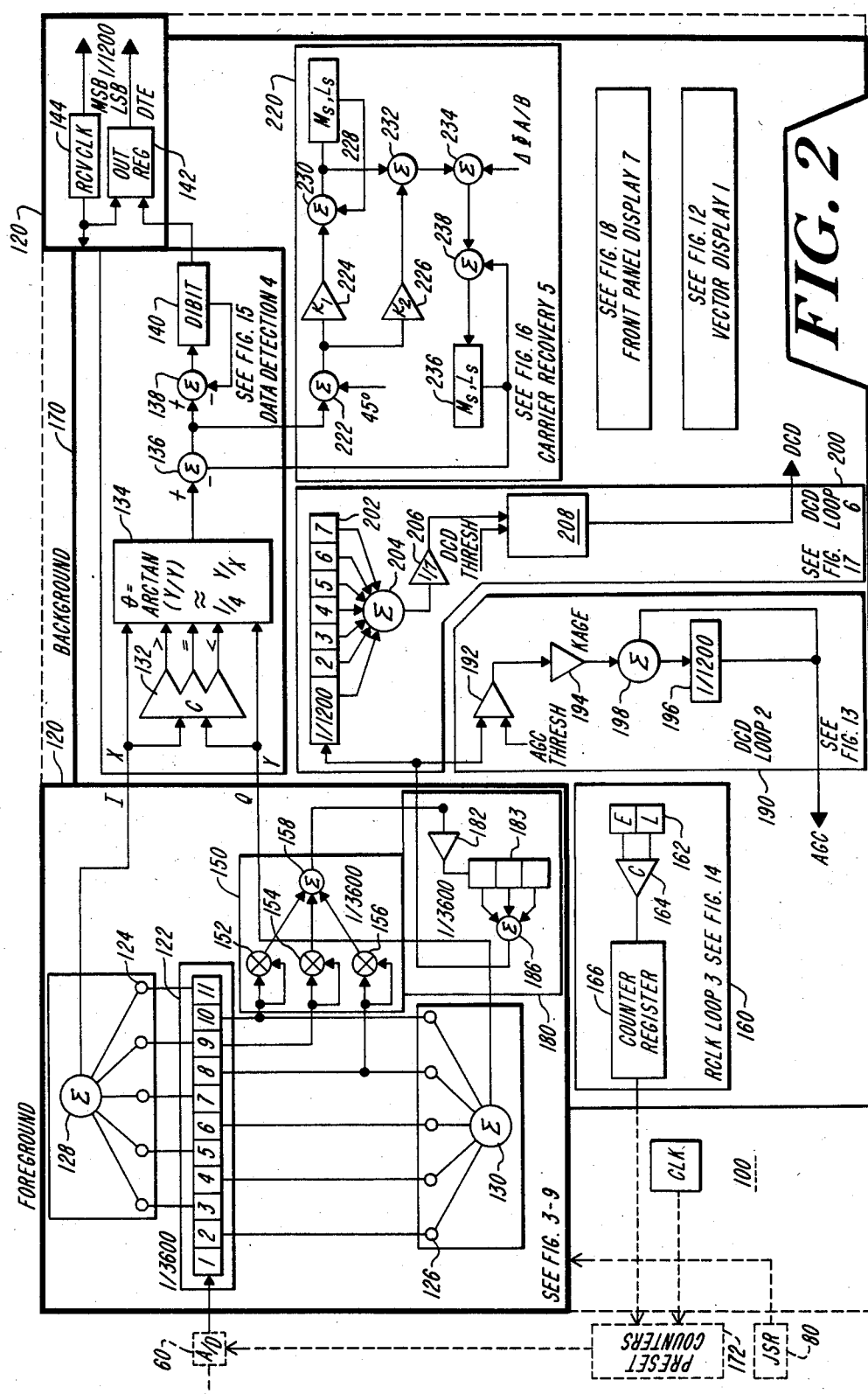

QPSK DEMODULATOR WITH I AND Q POST-DETECTION DATA CORRECTION

FIELD OF THE INVENTION

The present invention relates to modem receivers, in particular modem receivers having digital signal processing therein.

BACKGROUND OF THE INVENTION

Most present-day modem receivers compatible with the Bell Telephone 201 standards are implemented with LSI circuits or discrete digital logic elements, in combination with front-end filtering using analog components. The LSI circuits may be made for the specific modem design to provide a stable implementation and low cost in large quantities. However, custom LSI circuits inhibit design flexibility and have high initial costs. Modifications in modem design for system refinements and changes to accommodate specific modem applications are difficult, if not impossible, to make without completely redesigning the LSI circuits. Moreover, the associated analog components used in the modem receiver are susceptible to analog component tolerance and stability problems.

In some modem designs, the signal is digitized, and the filtering and processing functions are performed by specially designed circuits and systems optimized for signal processing using general digital signal processing techniques. The implementation of modem receivers in these systems is typically little more than a direct transformation and adaptation of general signal processing theory, which places a burden on the signal processing hardware to produce real-time performance. As a result, previous modem receivers having digital signal procesors require large or high-speed and therefore costly data processing structures.

BRIEF DESCRIPTION OF THE INVENTION

The 201 modem receiver according to the present invention uses a minimal amount of analog circuitry before signal digitization, the resulting signal being processed by a commonly available general-purpose microcomputer to perform substantially all of the receiver timing, control, signal detection, and data decoding functions using digital signal processing techniques which were otherwise only available to larger and more complex apparatus. In particular, Finite Impulse Response (FIR) filters are implemented in software and adjusted to provide other elements of the receiver architecture.

The modem according to the present invention also features noncoherent demodulation of the I and Q channel data, totally implemented in software. The data is corrected after detection by a second-order carrier tracking loop, which compensates for the use of noncoherent signal detection.

In addition, the receiver according to the present invention includes a receive-clock tracking loop which is controlled in the microcomputer software. Also included is a software-controlled digital automatic gain control (AGC).

The modem receiver according to the present invention provides the above-described functions with a minimal amount of analog and digital circuitry. In particular, the necessary modem signals, including the received data, all protocol and general functions are included within a single low-cost microcomputer circuit. The design according to the present invention is compact, low-cost, and can easily accommodate design changes or custom options.

BRIEF DESCRIPTION OF THE DRAWING

These and other features of the present invention are better understood by reading the following detailed description, taken together with the drawing, wherein:

FIG. 2 is a block diagram showing the function of the receiver demodulator of FIG. 1;

DETAILED DESCRIPTION OF THE INVENTION

Figure 1:
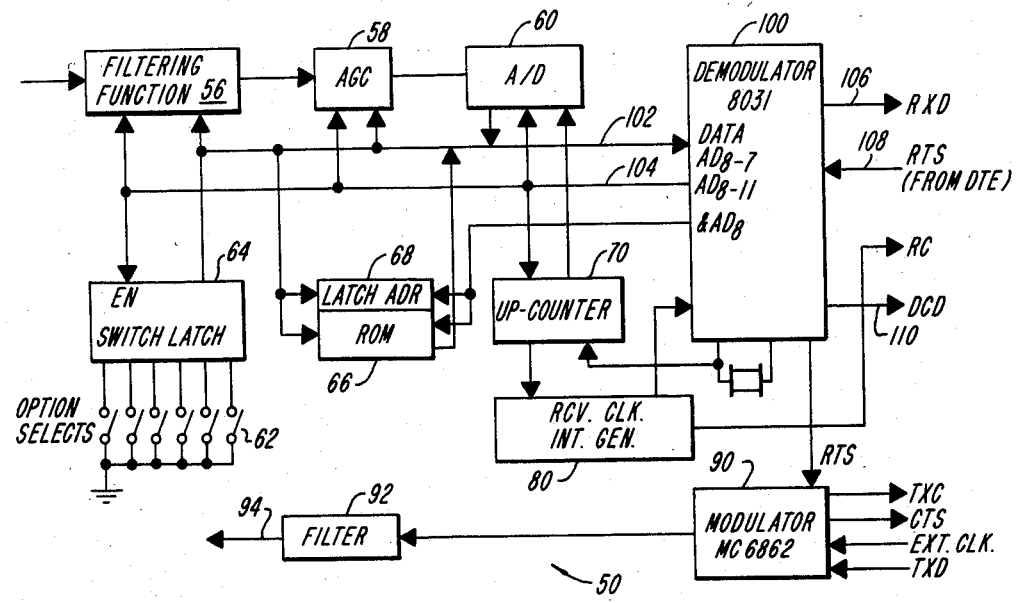
FIG. 1 is a block diagram of the modem according to the present invention.

The entire block diagram 50 of the 201-style modem is shown in FIG. 1. The signal is preconditioned by a filtering function 56. The output of the filtering function yields a conditioned signal having only components within the bandpass of interest defined by known modem parameters and implementation techniques. This signal is then received by an automatic gain control (AGC) circuit 58 which adjusts the signal to a predetermined value, which is in turn received by an analog-to-digital converter (ADC) 60. The ADC digital output signal is received by a demodulator 100 comprising an integrated circuit microprocessor, typically a part No. 8031 by Intel Corporation of Sunnyvale, Calif. The demodulator 100 also receives signals from a plurality of options selection switches 62 whose signals are received and stored by a switch latch 64 before being passed on to the demodulator 100. The demodulator 100 also communicates with a read-only-memory (ROM) 66 and to an address latch 68. The signals controlling the above-mentioned filters, control circuits, converters, and latches are transmitted on a data bus system comprising an eight-bit data bus 102 and an additional four-bits address on leads 104 from the output ports of the demodulator 100 integrated circuit microprocessor. The signal digitized by the ADC 60 and received by the demodulator is sampled at a rate determined by a programmable up-counter 70 receiving a predetermined number from the demodulator and a periodic clock signal from the demodulator 100 clock circuit. An internal interrupt signal provides a signal to the demodulator 100 to invoke the foreground mode, discussed below in FIGS. 3-9. The circuit 80 is connected to the presettable up-counter 70 and to provide a receive-clock (RC) signal to the external data terminal equipment (DTE). The demodulator 100 generates the received data on lead 106 comprising a string of binary "0s" or "1s," and receives an RTS (ready-to-send) signal on lead 108, as well as generating a carrier detect signal (DCD) on lead 110 to the DTE.

The transmitter portion of the modem 50 comprises a modulator integrated circuit or equivalent, typically a circuit such as a part No. MC6862 by Motorola Corporation of Chicago, Ill., whose function is described in the associated operation and data specifications, and is incorporated by reference. The modulator circuit 90 receives an RTS signal from circuit 100. The modulator 90 then sends a clear-to-send (CTS) and transmit clock (TXC) signal to the DTE. The DTE is now ready to transmit data on the TXD line. The modulator circuit 90 produces a differential phase shift keyed (DPSK) signal which is received by a bandpass filter 92 whose output at 94 comprises a band-limited signal to be carried through telephone lines or other audio communication paths.

The functional block diagram of the demodulator 100 is shown in greater detail in FIG. 2. The demodulator microprocessor includes the functions within the dotted enclosed area also labeled 100. A feature according to the present invention is the operation of the demodulator 100 completely within a single general-purpose integrated circuit microcomputer. In order to meet the modem requirements, the present invention adopts a foreground/background mode of operation, wherein the foreground mode functions are included within the boundary labeled 120, and the background functions are within the boundary labeled 170. The functions contained in the foreground mode have a priority which must be serviced at predefined time intervals occuring at a rate of 7200 Hz per second, wherein after each particular foreground function is serviced, the background function or functions may be processed during the time remaining before the next foreground interval. In particular, the foreground periods are determined by a periodic interrupt signal (7200 Hz) generated by circuit 80, which invokes an interrupt, causing the microprocessor to default to an interrupt service routine, and perform functions operative in the foreground mode 120 are shown in flowchart form in FIGS. 3-9 and discussed further below.

The present invention develops in-phase (I) and quadrature (Q) signals, also called X and Y respectively, for use in the process operation described below. The demodulator 100 receives the signals digitized by the ADC 60 into a sequence of microcomputer RAM locations forming a tapped delay line 122. The signals are read into the tapped delay line 122 at a rate corresponding to four times the carrier frequency (or 7200), or three times the bit rate of 2400. After each data signal is received by the initial delay line location, the data is advanced to alternate succeeding delay line locations at a rate of 3600 advances per second. The delay line 122 has two groups of signal taps, which occur at alternate tap intervals. The delay line taps yielding signals are selectively multiplied by coefficients at 124 and 126, and summed respectively at 128 and 130, producing the in-phase (X) and quadrature (Y) signals respectively. The multiplication coefficients at 124 are selected to provide a multitap FIR filter, as are the coefficients selected for 126, discussed in detail in FIG. 9, below. The FIR filter is structured as a lowpass filter with a passband of 0 Hz to 600 Hz (nominal), transition band of 600 Hz to 1800 Hz (nominal), and stopband of 1800 Hz to 3600 Hz, whose coefficient selection is known in the art, as taught in *Digital Signal Processing* by William D. Stanley, McGraw-Hill Press, 1975, incorporated by reference. The combination of the delay line 122 having offset alternate taps providing signals which are multiplied by coefficients at 124 and 126 and summed at 128 and 130 provide the novel "quadrature" filter of the present invention. In-phase and quadrature carriers and mixers found in other modem designs are absent from the structure because their "effect" has been folded into the FIR coefficients. The resulting in-phase and quadrature signals from the quadrature filter are then compared by a comparator 132, providing signals indicating the relative magnitude of the in-phase and quadrature signals. The relative magnitude of the X, Y signals according to techniques known in the art are used to determine the quadrant and octant wherein the received signal lies. Thereafter, the magnitude of the X, Y signals are subsequently used in an angle encoder 134, which provides a unique angle for a combination of the in-phase and quadrature signal according to the approximation of arctan (X/Y), discussed in detail below in regard to FIG. 15. The resulting angle estimate is combined at the summing element 136 with a correction signal derived by the carrier recovery loop described in more detail with regard to FIG. 16, below. The signal resulting from the summing device 136 is then received by a differential phase decoder circuit, including a difference element 138 in combination with a storage element 140, which provides the differential phase decoding, known in the art. The resulting data signal is transmitted to the external data terminal equipment (DTE) by an output register 142 which is clocked at a rate provided by a receive-clock 144, operating in the foreground mode.

Figure 2A:
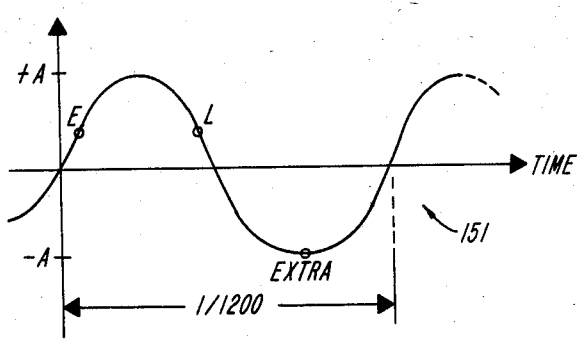
FIG. 2A is a wave showing the early and late sample points.

The sampling rate by which the ADC 60 acquires and digitizes the received analog signal is established and adjusted by a loop circuit. Digitized signals are received from the delay line 122 at Taps No. 8, 9, and 10, which are in turn squared by multiplication devices 152, 154, and 156, and are then summed by a summer 158 at a rate of 3600 times per second. The resulting signal is stored in a register 162 having an early and late location, corresponding to the signal from the summer 158 at a point before the optimum sample time and a point after the optimum sample time; the curve 151 showing the signal output of circuit 150 and the early (E) and late (L) samples are shown in FIG. 2A. The respective E and L signals are compared for magnitude in comparator 164, which increments a counter register 166 depending on the relative magnitude of the early and late signals. In particular, if the E and L signal magnitudes are the same, the counter register 166 will remain static or unchanged. However, if either the E or L magnitude is larger than the other, the counter register 166 will be incremented or decremented respectively. The resulting register 166 number value is then transferred to a presettable counter 172 which receives a clock signal from the demodulator 100, to produce a sample control signal received by the ADC 60. Therefore, if the early signal in register 162 is larger than the late signal, the counter register is incremented, thereby increasing the number to which the counter 172 is preset. The counter 172 then takes longer to produce an output signal, which results in a longer period before the next sample signal is produced, thereby delaying the acquisition of the next signal. The results is that the subsequent early signal is reduced in magnitude. The ADC sample loop circuit as described above may also be termed a "first order" loop; other loop implementations, such as a "second order" loop, are within the scope of the present invention. An example of the second order loop is shown in regard to the carrier recovery circuit of FIG. 16, below.

Also in foreground mode, a filter output of the receive-clock signal is provided by circuit 180 which multiplies the signal by a constant multiplier 182 and in turn filtered by a three-stage tapped delay line 183 whose output signals are received by a summer 186. The summer output is then processed in background mode to produce the AGC control signal in circuit 190 and the carrier detect signals in circuit 200. In the AGC circuit, the filtered output of summer 186 is compared with a predetermined threshold value by a comparator 192 and when in excess of the threshold count, the resulting signal is multiplied by a constant by amplifier 194. The resulting signal is filtered by a single-stage filter including delay line 196 and summing device 198, to produce the filtered AGC signal which controls the AGC circuit 158 of FIG. 1. The AGC signal is transmitted to the control unit 58 along the data lines according to techniques known in the art and not discussed here.

The delayed carrier detect signals are produced by circuit 200 which receives the filtered receive-clock waveform and futher filters it by a seven-stage square window FIR filter including a delay line 202 and a summing device 204, whose output is normalized by a gain constant by amplifier 206. The resulting signal is then compared with a delayed clock detect signal threshold by circuit 208 which includes a comparator having hysteresis, whose implementation is well known in the art.

According to the present invention, the decoded phase estimate from the phase estimate circuit 134 is corrected or adjusted for errors by a post-detection carrier recovery circuit 220. The signal received by the carrier recovery circuit 220 is initially rotated by adding a 45° offset to summing device 222 whose output is received along two separate paths including constant factor amplifier 224 and 226. The amplifier 224 output is received by an accumulator, also functioning as a filter, including a storage element 228 and summing device 230. The output of the summing device 230 together with the output from amplifier 226 is received by a summing device 232, whose output is then selectively offset at summing device 234 by adding a predetermined signal which provides a selectable A or B demodulation characteristic, corresponding to the offset in the constellation of the received quadrature data signals. The signal resulting from this offset is received by another accumulator, including register 236 and summing device 238. The resulting signal is then received by the summing device 136 to provide a corrected phase estimate.

In the remaining time, additional system services are implemented by software in the demodulator 100, which services the front panel display to provide a running display of the system activity, as well as to read switches or other selector devices which allow the operator to define system options. The above described demodulator 100, together with the entire modem system 50, can be implemented entirely out of discrete analog or digital logic elements, as desired. However, the preferred embodiment also includes substantially all of the functions described in FIG. 1 within a microcomputer device, whose functions are implemented by software programs.

Figure 3:
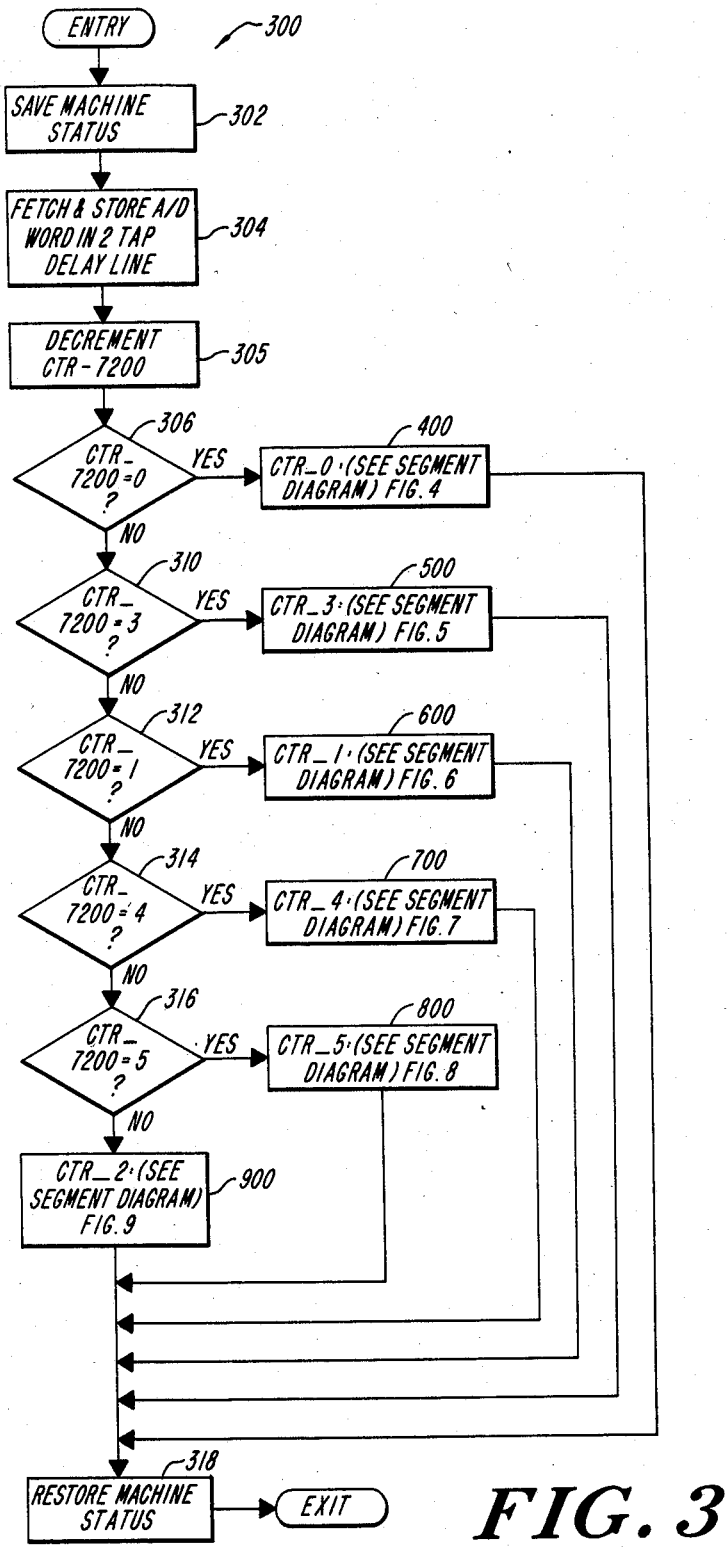
FIG. 3 is a flowchart showing foreground processing in conjunction with the background processing of FIG. 10, below.
Figure 7:
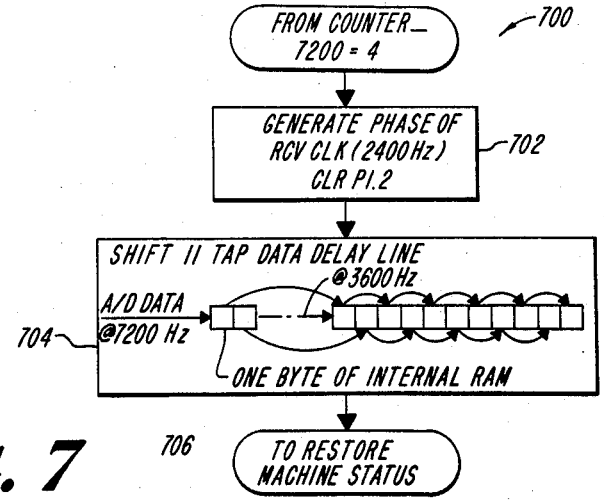
FIG. 7 shows the fourth segment subroutine of FIG. 3.
Figures 8, 10:
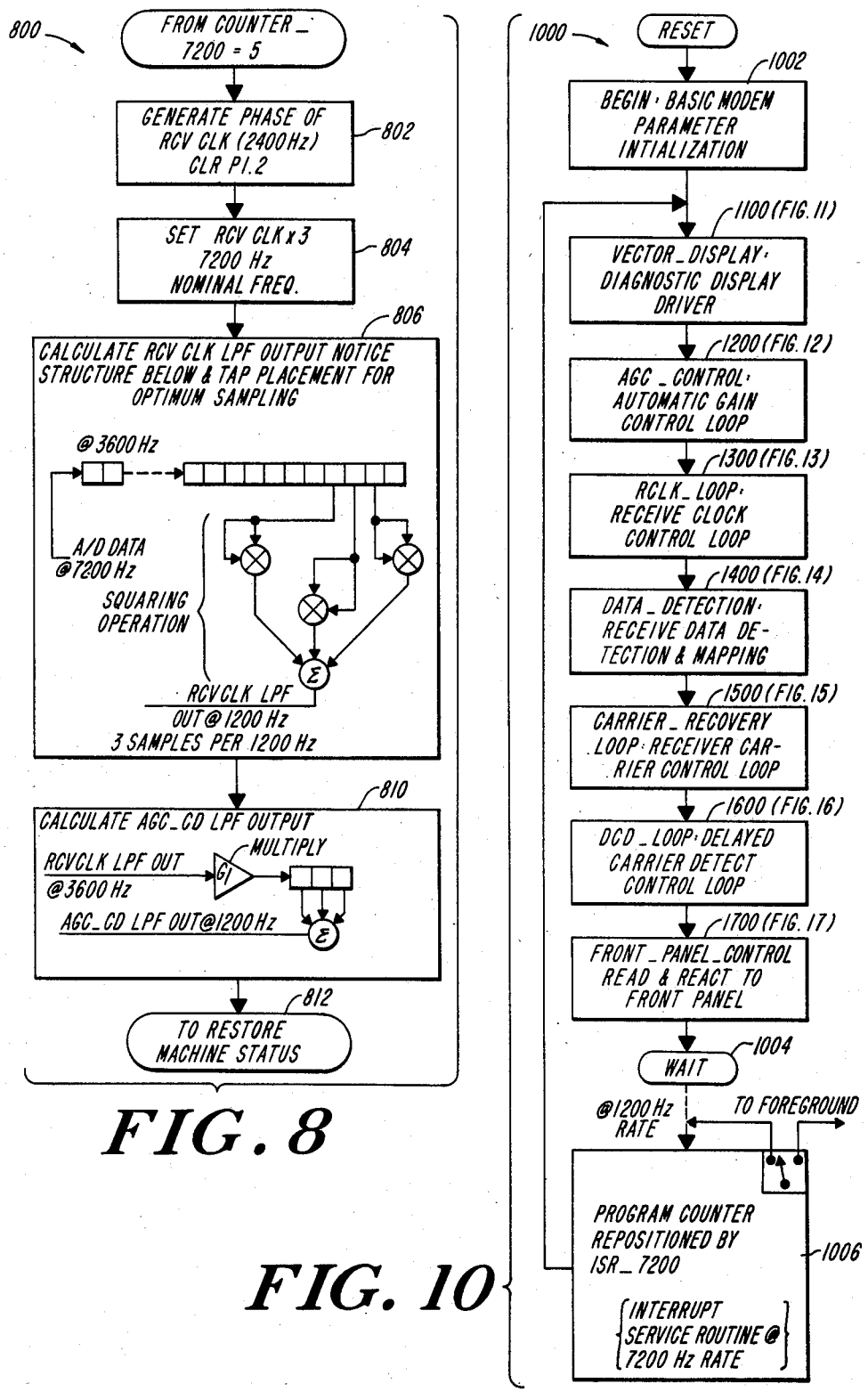
FIG. 8 shows the fifth segment subroutine for the foreground mode of FIG. 3.
FIG. 10 shows the background processing flowchart having an interrupt to refer to the interrupt for foreground mode of FIG. 3.
Figure 9:
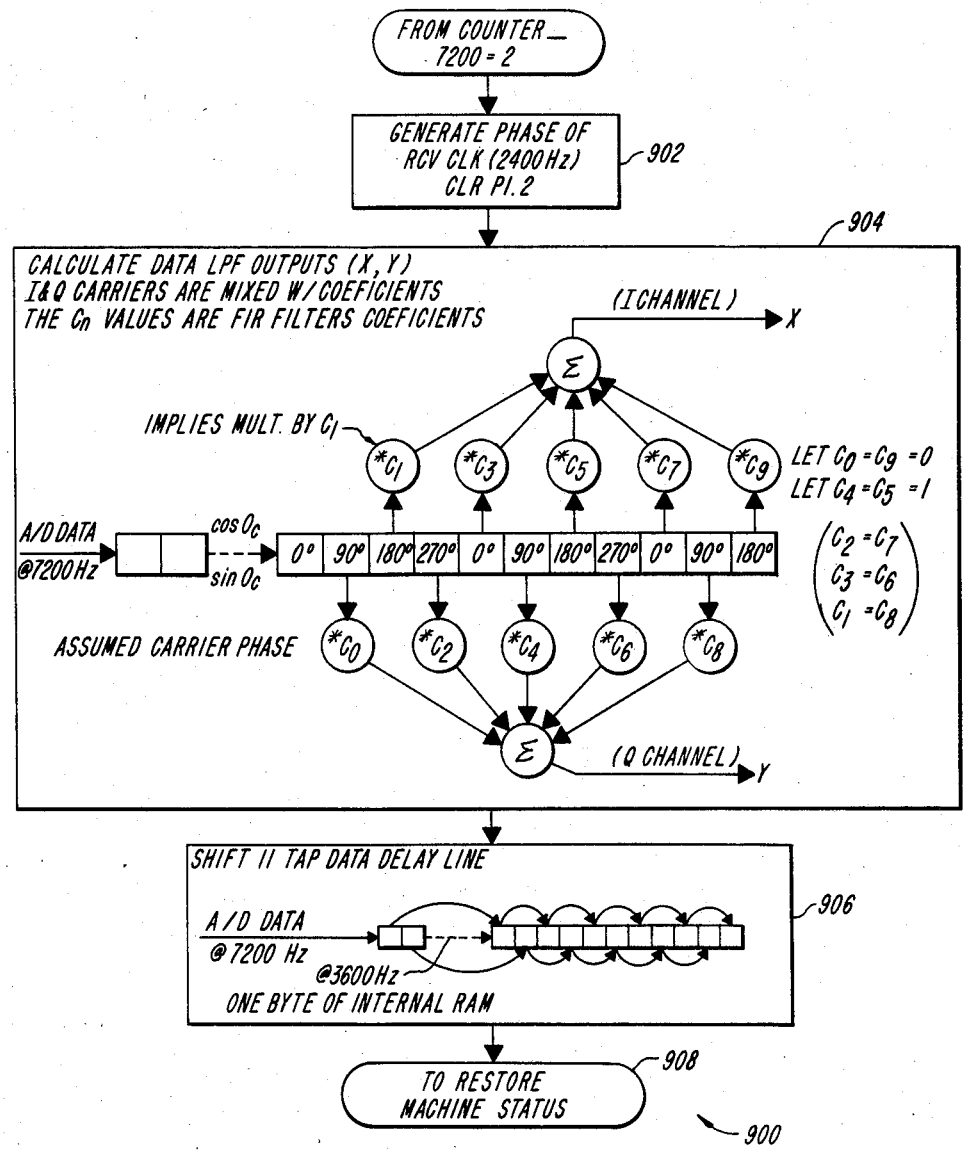
FIG. 9 shows the sixth segment subroutine for the foreground mode of FIG. 3.

The particular software implementations used in the present embodiment are shown below in FIGS. 3–18; the foreground mode functions are shown in FIGS. 3–9; and the remaining figures demonstrate the background mode functions. Upon the generation of an interrupt signal from FIG. 1 circuit 80, the foreground or interrupt routine steps are initiated. As shown in FIG. 3, the general control and operation of the foreground mode includes the saving of the background mode machine status at step 302, generally automatically performed according to the particular microcomputer chosen. Afterwards, the digitized signal from the ADC 60 is fetched and stored in the first storage location of the tap delay line (122 of FIG. 2) at step 304. A counter, having a sequence of 5-0, is decremented at step 305 by one each cycle of the foreground process. The foreground process occurring at an interrupt period of 7200 per second, enters a test step 306 to determine if the counter value is currently zero. A true result invokes the CTR 0 segment, discussed below in FIG. 4. A false test results in a subsequent test at 310, which tests the counter for a value of 3. A true result invokes the CTR 3 subroutine at 500, shown in FIG. 5. A false test results in a subsequent test at 312, where the counter is tested for a value of 1. A true result invokes a CTR 1 subroutine 600, shown in FIG. 6. A false result causes a test of the counter at step 314 for a value of 4. A true result invokes the CTR 4 subroutine 700, shown in FIG. 7. A false result allows a subsequent test for a counter value at 5 at step 316. A positive result invokes the CTR 5 subroutine 800, shown in FIG. 8. If the tests described above all result in a negative or false condition, a value of 2 is assumed, and the CTR 2 subroutine 900, shown in FIG. 9, is entered. At the completion of the various subroutines 400, 500, 600, 700, 800, and 900, the background information and processes are restored in the microcomputer at step 318, and returns to the background mode as shown in FIGS. 10–18, below.

Figure 4:
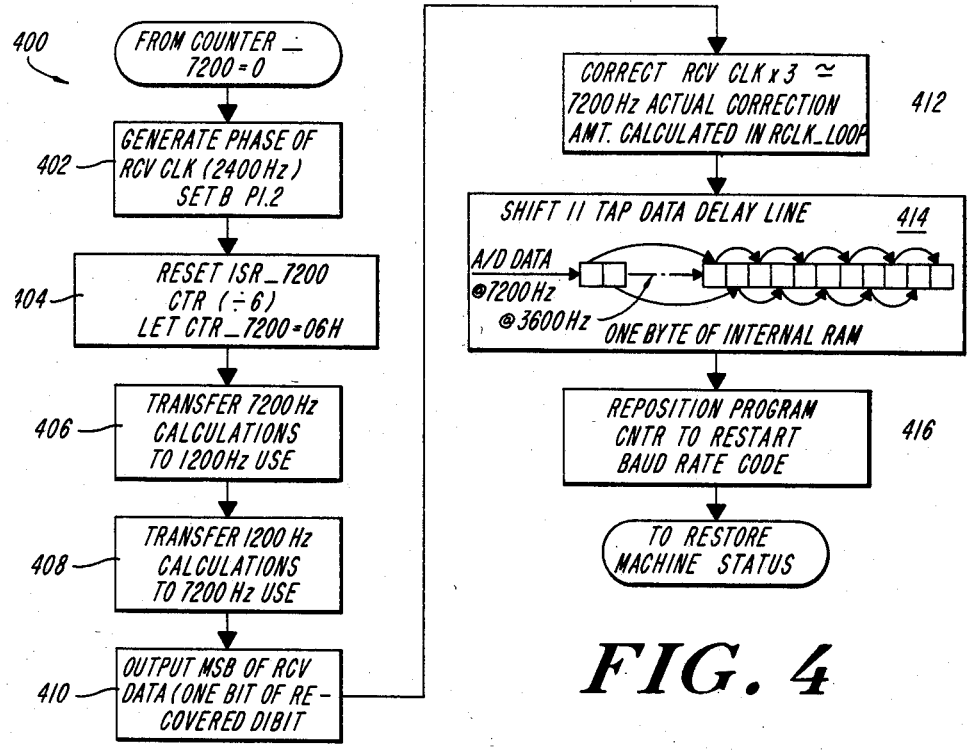
FIG. 4 shows the first segment subroutine of the foreground mode.

The CTR 0 subroutine 400, shown in FIG. 4, generates a phase of the receive clock, at a 2400-Hz rate according to step 402. Next in step 404, the interrupt service routine (ISR) counter is reset to a value of 6. The transfer of signals between foreground and background mode occurs at an interval of 1200 times per second, or one-sixth of the interrupt time cycle. Steps 406 and 408 provide the transfer of signal calculations for the respective processing needs at the 7200-Hz or 1200-Hz rate. Next, at step 410, the most significant bit of the receive data, processed according to flowcharts discussed below, is shifted out of the output register 142. The third multiple of the correct clock frequency is produced in step 412, wherein the actual correction is calculated in background loop shown in FIG. 14, discussed below. In step 414, the data previously received in the first stage of the delay line 122 is shifted to subsequent locations along the delay line. In particular, the signals are shifted two locations at step 414, at a rate of 3600 Hz. The program counter is repositioned to start the baud rate code at step 416, and the CTR 0 subroutine 400 is ended to return to the background mode, as discussed with regard to FIG. 3 above.

Figure 5:
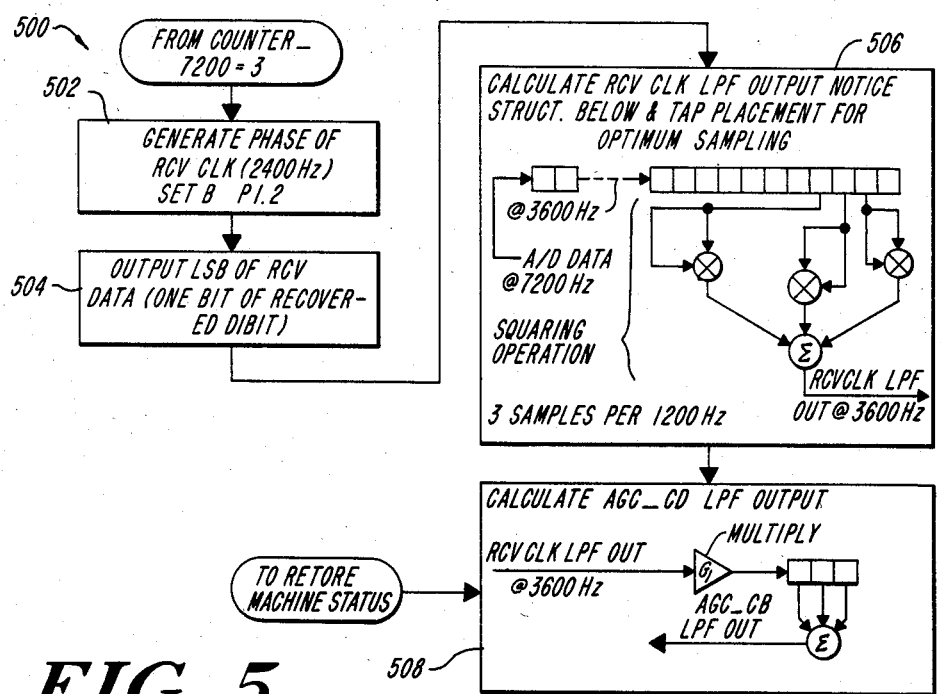
FIG. 5 shows the second segment subroutine for the foreground mode.

The CTR 3 segment 500 is shown in FIG. 5, which is called when the ISR counter has a value of 3. In step 502, a phase of the 2400-Hz receive clock is generated, and the least significant bit (LSB) of the receive data is produced by the output register 142 at step 504. Next in step 506, the receive-clock lowpass filtered output signal is generated by squaring the outputs 8, 9 and 10 from the shift register 122 in summing the result according to the circuit block 150 of FIG. 2. The receive clock produces three samples per 1200-Hz background cycle. Next the automatic gain control and carrier detect lowpass filter frequency output is calculated at step 508. Corresponding to the circuit block 180 of FIG. 2, the microcomputer implemented demodulator 100 multiplies the lowpass filter output and subsequently filters it with a three-stage FIR filter, having an output sample at a 1200-Hz rate. Thereafter, the microcomputer implemented demodulator 100 restores the background operation machine status and continues in the respective mode.

Figure 6:
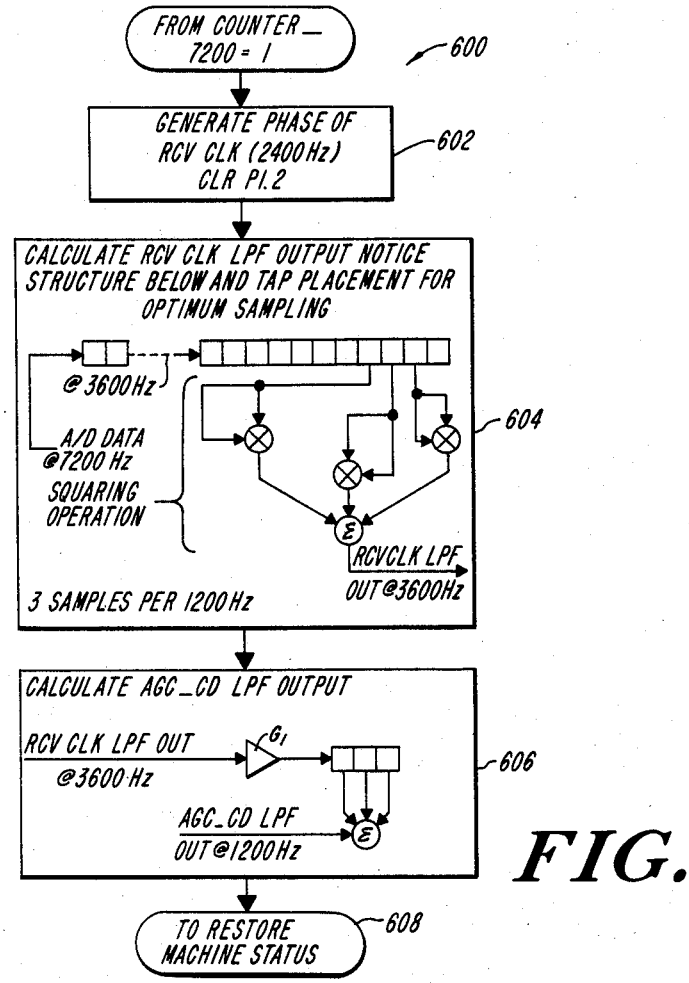
FIG. 6 shows the third segment subroutine of the foreground mode of FIG. 3.

The CTR 1 subroutine 600 is shown in FIG. 6. the next phase of the receive clock is generated at step 602, whereupon the receive-clock lowpass filter is calculated at step 604, corresponding to the calculation at circuit block 150, discussed earlier, and equivalent to the calculation at block 506 discussed earlier. Subsequently, the AGC and CD lowpass filter output calculated at block 606 corresponding to the circuit block and the function step 508 discussed above. Thereafter, the microcomputer return to the background mode by restoring the machine status at step 608.

The CTR 4 subroutine 700 is shown in FIG. 7. A phase of the receive clock is generated at step 702. The digitized receive signal is shifted in the internal delay line 122 to subsequent delay line locations at step 704, corresponding to the earlier discussed shift of signals in steps 414 of FIG. 4. Thereafter, the background operation is restored by restoring the machine status at step 706.

The CTR 5 segment subroutine 800 is shown in FIG. 8. A phase of the receive clock is generated at step 802, and the nominal frequency of the third multiple (7200 Hz) of the receive clock is set at step 804. The receive-clock lowpass filter signal is produced in step 806, corresponding to the circuit block 150 of FIG. 2 and the above-described step 506 of FIG. 5. Next at step 810, the AGC CD lowpass filter output is calculated, corresponding to circuit block 180 step 508 of FIG. 5. Thereafter, the machine returns to background operation by restoring the machine status at block 812.

The CTR 2 subroutine 900 is shown in FIG. 9. A phase of the receive clock is generated at step 902. The in-phase and quadrature (X,Y) signals are provided from the sampled digitized received data by a quadrature filter implemented according to step 904. Step 904 provides the respective in-phase and quadrature signal to be composed from a plurality of delay line taps weighted by predetermined coefficients. The method of implementing the weighted delay line taps are well known in the art and not discussed here. Of particular significance is the implementation of the tap delay line and a multiple of the frequency of the signal received, the in-phase and quadrature being received at alternating taps, the taps being exemplified by taps 2, 4, 8, and 10, and 3, 5, 7, 9, and 11. Thereafter, at step 906, the signal in the delay line 122 is shifted at a rate of 3600 Hz per shift of two stages, also described in step 414 above. The coefficients of the background operations are restored and the microcomputer demodulator 100 returns the background mode at step 908.

Figure 11:
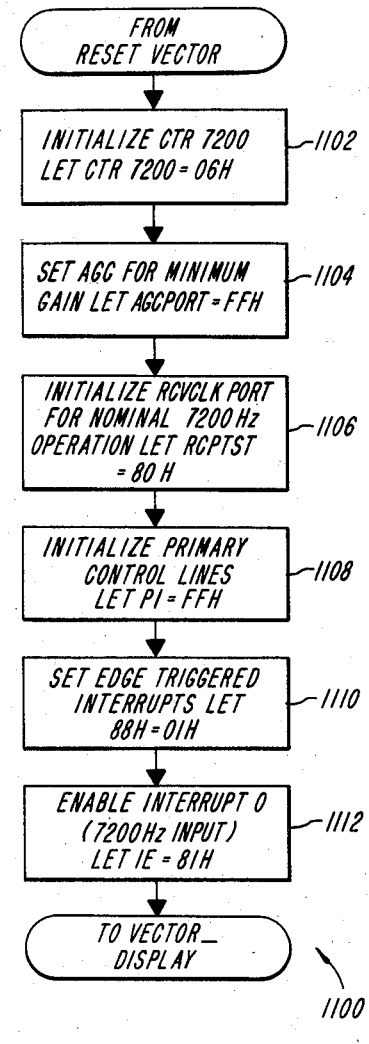
FIG. 11 is a flowchart of the initialization subroutine for the background mode of FIG. 10.
Figure 12:
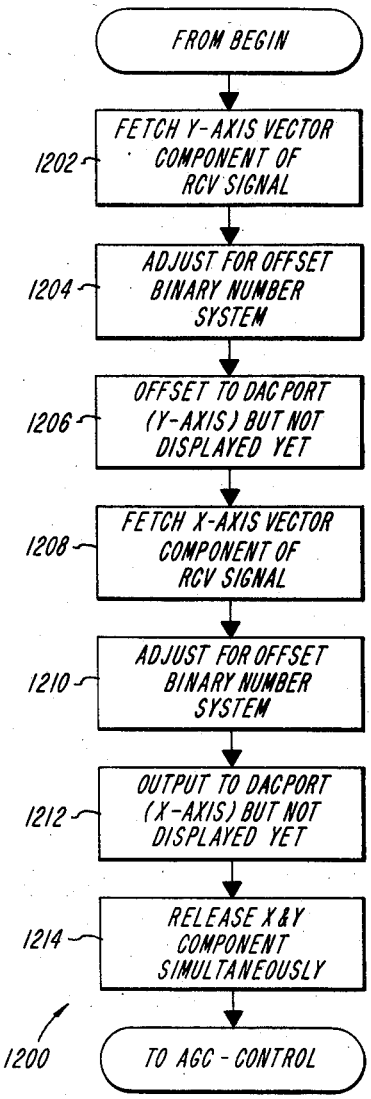
FIG. 12 is the vector display subroutine for the background mode of FIG. 10.

The background mode of operation is shown generally at FIG. 10. When the modem is initially turned on, the parameters are initialized at step 1002. Thereafter, the vector display subroutine 1100 provides a diagnostic display signals which are used to display the system status and error conditon codes, according to the particular implementation of the present embodiment. Thereafter, the automatic gain control parameters are chosen in the AGC subroutine 1200, shown in FIG. 12. The receive-clock control loop 1300 then determines a sample interval and adjusts the signal according to the parameters of the subroutine discussed in FIG. 13. Next, a receive data detection and mapping subroutine 1400 produces estimated data signals. The receiver carrier recovery control loop 1500 provides a recovered carrier signal, further correcting the received data signal shown in further detail in FIG. 15. The delayed carrier detect control loop subroutine 1600 provides the additional delayed carrier detect signal, shown in detail in FIG. 16. The front panel control subroutine 1700 reads and adjusts the parameters of the system according to the switch options selected. A wait state 1004 consumes the remaining microcomputer operation time until the next program counter interrupts service routine signal occurs. According to the present invention, the background processing mode proceeds at a rate of 1200 operational passes through each subroutine cycle per second. Upon the occurrence of an interrupt, the program counter at block 1006 jumps to the foreground mode, discussed in regard to FIGS. 3-9 above. Upon completion of the particular cycle in the foreground mode, the microcomputer demodulator 100 then returns to block 1100 to recalculate the subsequent subroutine functions. The begin subroutine 1100 is shown in FIG. 11, which initializes the CTR 7200 counter to a value of 6 at step 1102. The AGC is preset for a minimum gain at step 1104. The receive clock port for normal operation at 7200 Hz is initialized at step 1106. The priority control lines are initialized at step 1108. The edge trigger interrupts are set at step 1110 and the interrupt enable is set at step 1112. Thereafter, the vector display subroutine 1200 begins.

The vector display subroutine 1200 fetches the Y-axis vector component of the receive signal at step 1202, and adjusts for a binary offset number system at step 1204. The output signal to the DAC port corresponding to the Y-axis signal is generated at step 1206, but is not displayed until a subsequent step. The X-axis vector component of the receive signal is fetched at step 1208, and adjusted for a binary number system at step 1210. The output of the X-axis signal is set to the DAC port at step 1212. The X and Y components are released simultaneously to the display at step 1214. Afterwards, the background continues with the AGC control subroutine shown in FIG. 13.

Figure 13:
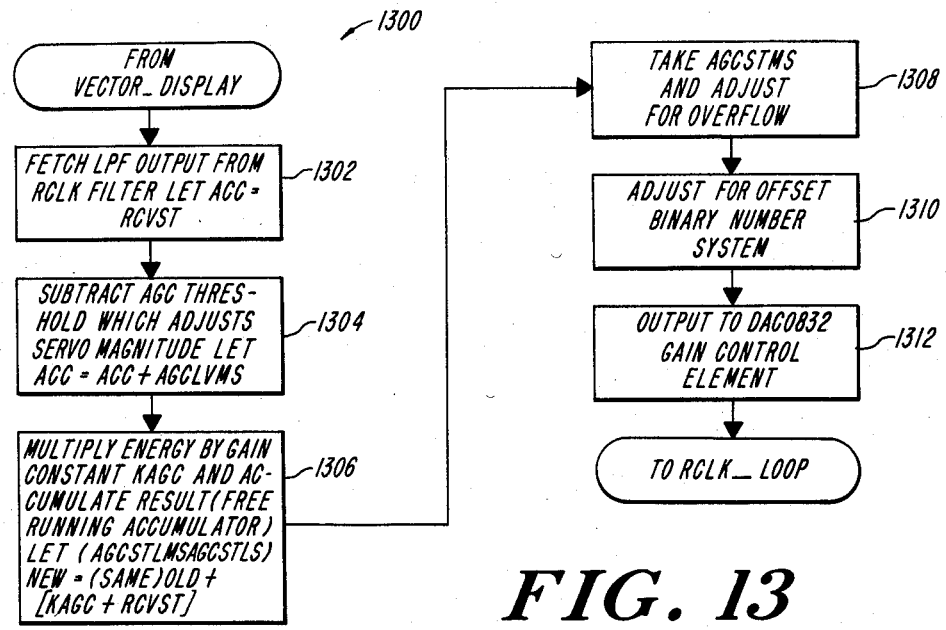
FIG. 13 is the AGC control subroutine for the background mode of FIG. 10.

The AGC control subroutine 1300 is shown in FIG. 13, which first fetches the lowpass filter output signal from the receive-clock filter at step 1302. The AGC threshold value is subtracted from the received signal and adjusted for a servo magnitude at step 1304. Next, at step 1306, the energy of the signal multiplied by a gain contstant ($K_{AGC}$) and the result is accumulated by a free-running accumulator, shown in block 190 in FIG. 2. The result is adjusting for overflow at block 1308, and also adjusted for an offset binary number system at step 1310. Thereafter, at step 1312, the signal is sent to the DAC output to control the gain of the block 58.

Figure 14:
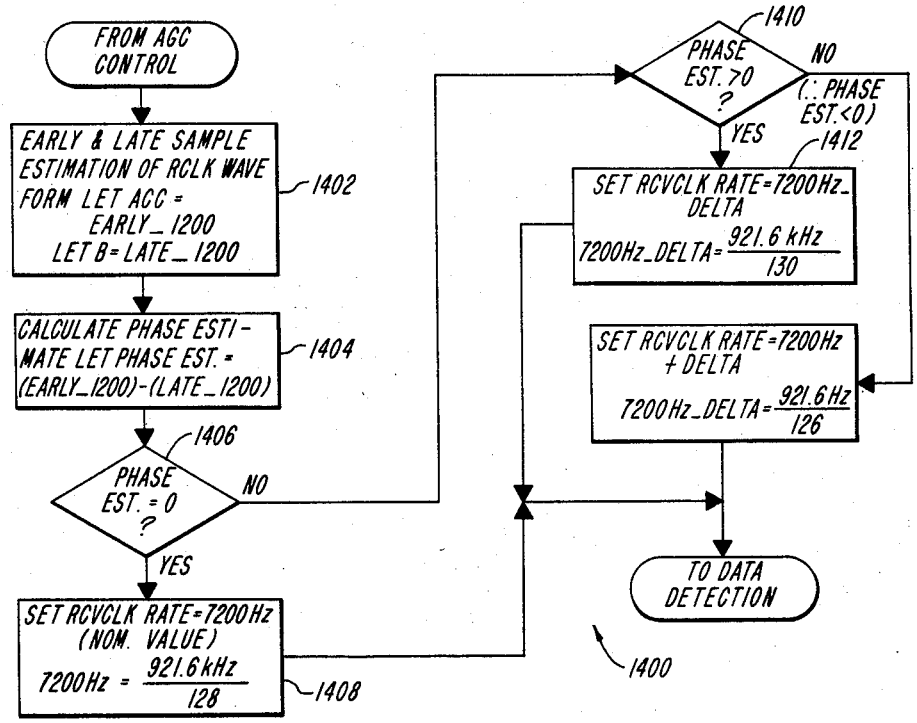
FIG. 14 is the receive-clock loop subroutine for the background mode of FIG. 10.

The receive-clock loop subroutine 1400 is shown in FIG. 14. In step 1402, an early and late sample estimation of the receive-clock waveform is determined. Next, at step 1404, a phase estimate is calculated from the difference between the early and the late signals. The resulting phase estimate is tested at step 1406 against a predetermined phase estimate. If the test is positive, the receive-clock rate is set at the nominal 7200-Hz rate at step 1508, whereupon the program advances to the next subroutine. If the test at step 1406 fails, the phase estimate is next tested to determine if the phase estimate exceeds a predetermined phase at step 1410. If the test at step 1410 indicates that the phase is greater than the predetermined estimate, the received clock rate is decreased by a small amount ($\Delta$) at step 1412, whereupon the next subroutine begins. If the test at 1410 fails, the logical conclusion indicates that the phase estimate is less than the predetermined phase, and the receive-clock rate is increased by the amount $\Delta$. Thereafter, the next subroutine begins.

Figure 15:
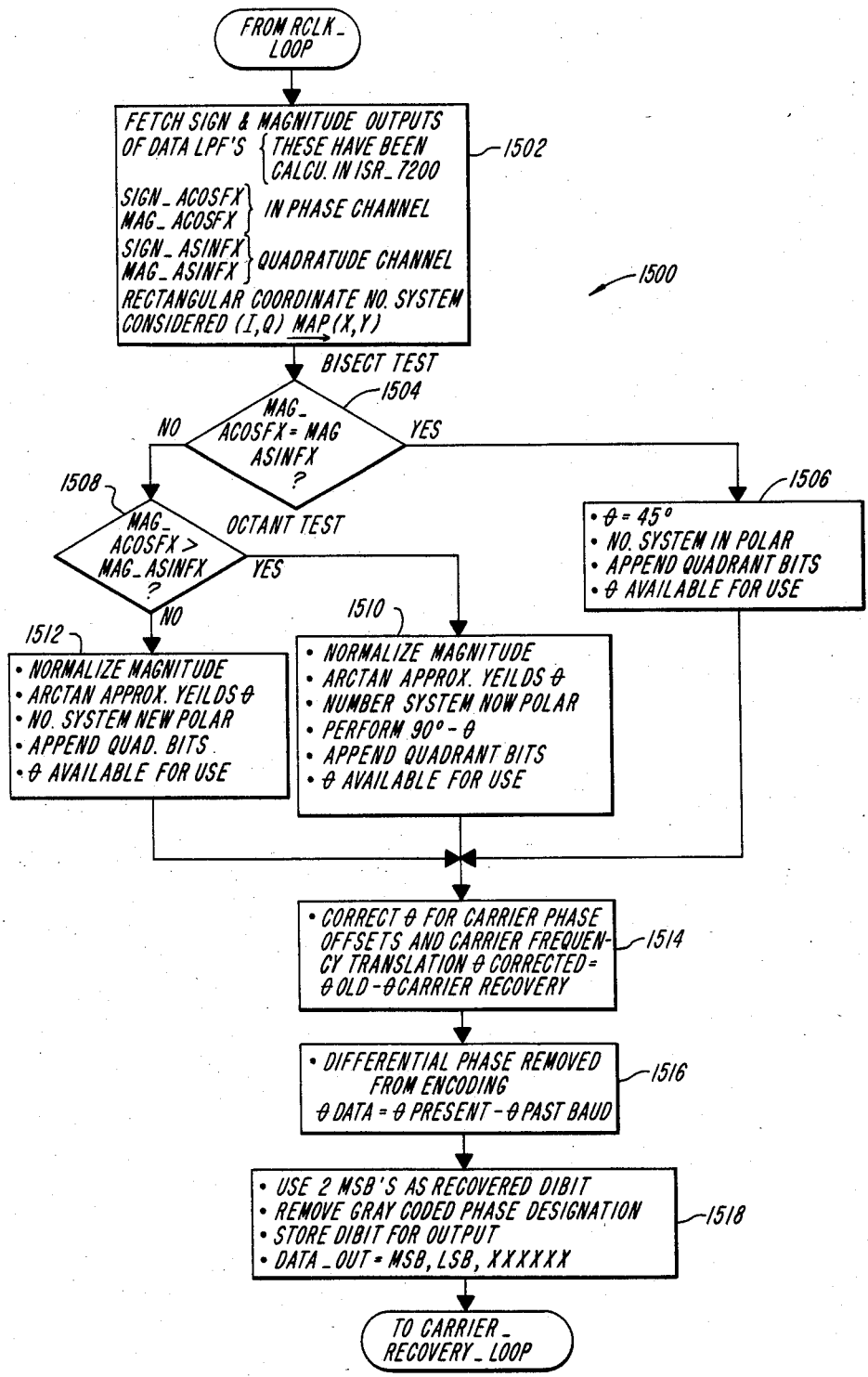
FIG. 15 is the data detection subroutine of FIG. 10.

The data detection subroutine 1500 is shown in FIG. 15. In step 1502, the sign and magnitude of the respective X,Y quadrature signals are received. The rectangular coordinate system will be mapped into the polar coordinate system having eight bits of angle resolution. Next at step 1504, the signal is tested to determine if the magnitude of the cosine equals the magnitude of the sine. If it does, the angle is therefore 45°, and the number system is translated for use in polar coordinates, as well as appending the quadrant bits in step 1506. If the test at step 1504, the signal is now tested to determine which octant the signal lies in by comparing the magnitude of the cosine to the magnitude of the sine of the signal at step 1508. If the magnitude of the sine is greater, the signal is normalized in magnitude at step 1510, and the arctangent is calculated to yield the approximate signal angle $\theta$. The number system is now in a polar coordinate and the angle $\theta$ is subtracted from 90°. The quadrant bits, determined above, are appended and the angle $\theta$ is now available for use. If the test at step 1508 fails, the logical conclusion is that the magnitude of the sine is greater. Therefore, at step 1512, the magnitude is normalized and the arc tangent is calculated to yield the approximate angle $\theta$. The number system is now in polar coordinates whereupon the quadrant bits are appended. At step 1514, the angle $\theta$ is corrected for carrier phase offsets and carrier frequency translation errors. Afterwards, at step 1516, the differential phase characteristic is removed by subtracting the previous baud angle $\theta$ from the present one. Finally, at step 1518, the two most significant bits (MSB) are recovered as a dibit, and the Grey-encoded phase designation is removed. The dibit is stored for output and the background enters the next subroutine.

Figure 16:
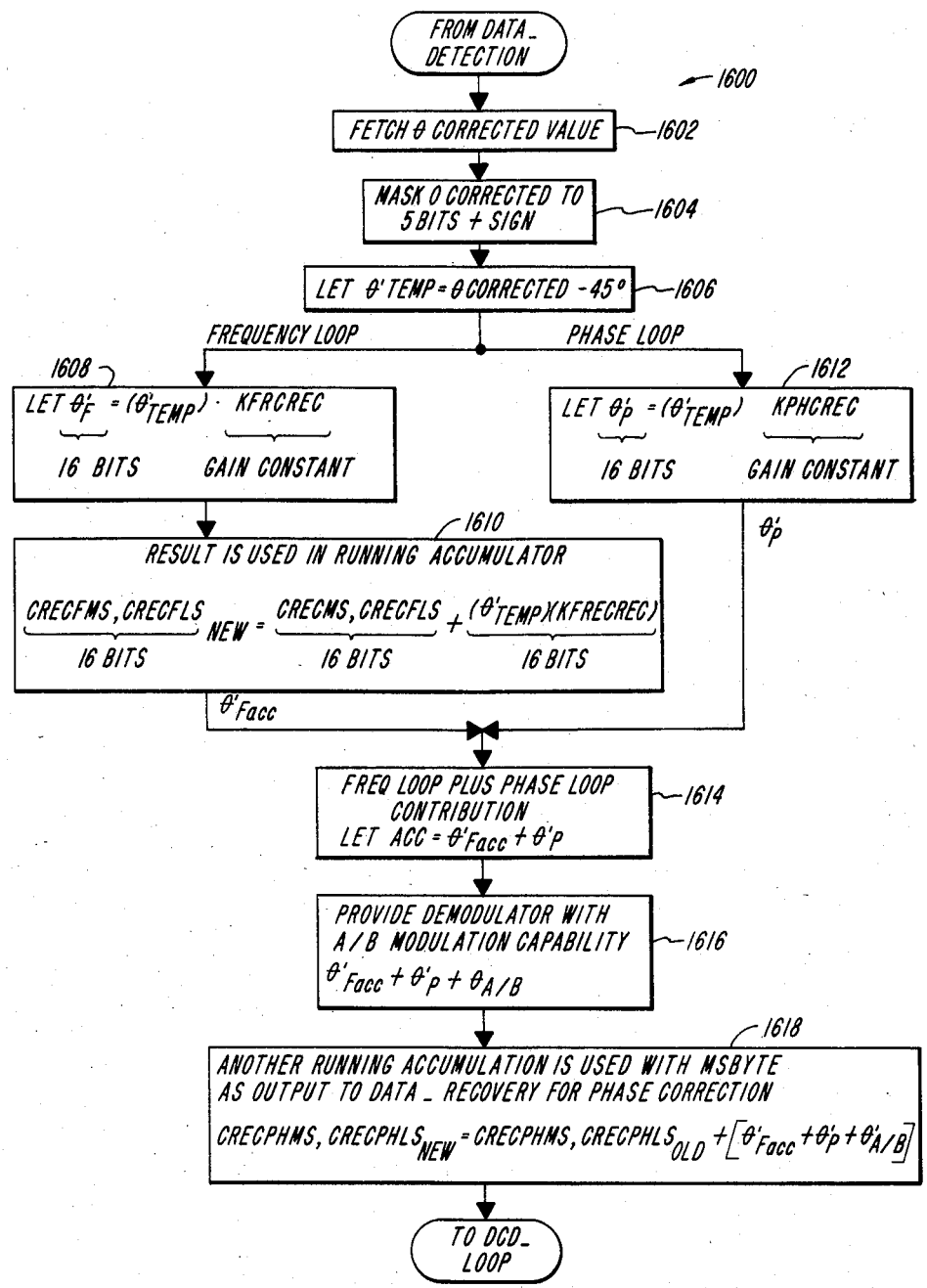
FIG. 16 is a flowchart showing a carrier recovery loop subroutine of the background mode of FIG. 10.

The carrier recovery loop 1600 is shown in FIG. 16. The previous $\theta$ value is fetched at step 1602 and masked to recover five bits plus the sign at step 1604. A temporary phase angle is provided at step 1606 by subtracting 45° from the previous phase angle of step 1604. The signal is processed according to a frequency and phase loop which include separate processes. The frequency loop multiplies the temporary phase angle estimate by a gain constant and accumulates the results in a register in steps 1608 and 1610 respectively. The phase loop multiplies the temporary $\theta_T$ at step 1612. The resulting signals from steps 1610 and 1612 are added in step 1614, and selectively shifted in step 1616 according to the particular location of the quadrature signals according to an A or B signal modulation. A subsequent running accumulation is provided at 1618 where the most significant bit provides the output to the data recovery subroutine for phase correction.

Figure 17:
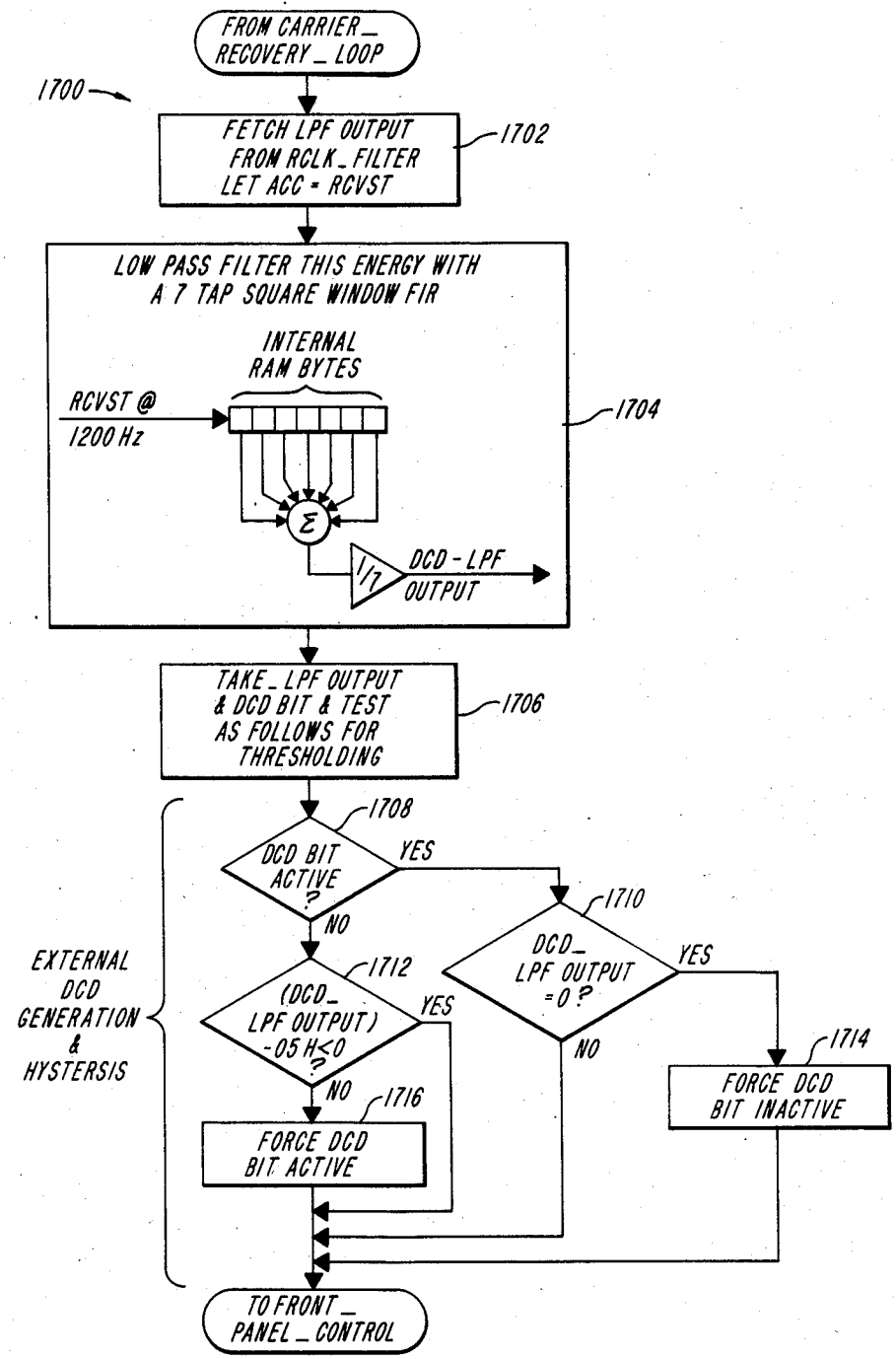
FIG. 17 is the DCD loop subroutine of the background mode of FIG. 10.

Next, the delayed carrier detect subroutine 1700 of FIG. 17 fetches the lowpass filter output signal from the receive-clock filter shown as 180 in FIG. 2 at step 1702. This signal is subsequently processed at a seven-tap square window FIR to provide a lowpass signal at step 1704. The signal is tested at step 1708 to determine if the DCD bit is active. If the test is positive, the DCD lowpass filter output signal is tested for a value of 0 at step 1710. If the value equals 0, the DCD bit is sent to an inactive state at step 1712. If the DCD bit is not active, the difference between the DCD lowpass filter output from the threshold, 05H, is compared to zero. If zero is greater, the program continues with a subsequent subroutine. If the difference is not greater, the DCD bit is forced to the active state at step 1716.

Figure 18:
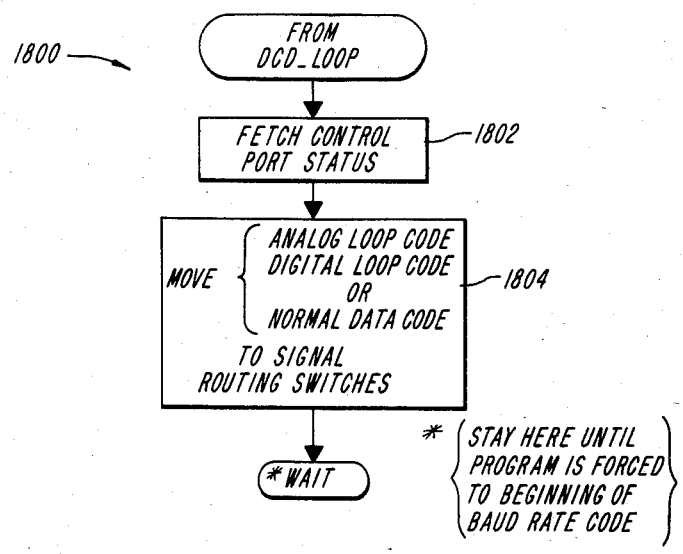
FIG. 18 is the front panel control subroutine of the background mode of FIG. 10.

The background subroutine 1800 services the front panel control switch as shown in FIG. 18. The control port status is fetched at step 1802 and the respective analog loop, digital loop, or normal data code signals are moved to the signal routing switches at step 1804. These and other analog loop and digital loop test modes are known in the art and not discussed here.

The above-described modem and in particular the microcomputer embodiment of the demodulator 100 can include a variety of implementations and system details other than that discussed above as selected by one skilled in the art, and in particular can include discrete hardware logic elements and other digital processors. Therefore, the modem according to the present invention is not to be limited, except according to the claims which follow.

What is claimed is:

1. A quadrature phase shift keying receiver, including:
   means for sampling a quadrature phase shift keyed signal according to a sample clock signal;
   quadrature filter means receiving the output of the means for sampling and providing in-phase, quadrature, and error outputs;
   error loop means receiving said error output from the quadrature filter means and providing an error signal;
   sample clock means for providing said sample clock signal to said means for sampling, the position of which being adjusted according to said error signal; and
   data demodulator means for providing a data signal according to the in-phase output and the quadrature output of said quadrature filter means.

2. The quadrature phase shift keying receiver of claim 1, wherein
   said quadrature filter means further comprises shift register means receiving said sampled input signal and shifting said signal at a rate, said shift register also having an output tap at each shift register stage providing an output signal corresponding to the signal stored therein;

first means for simultaneously receiving tap signals from a set of alternate shift register taps, providing a first output to said error loop means;

second means for simultaneously receiving tap signals from a set of alternate shift register taps, providing an output signal to said data demodulator.

3. The quadrature phase shift keying receiver of claim 2 wherein said first means for simultaneously receiving includes means to receive tap signals from an in-phase set of alternate shift register taps, and second means for simultaneously receiving includes means for receive tap signals from a quadrature set of alternate shift register taps different from said in-phase set.

4. The quadrature phase shift keying receiver of claim 3, wherein said means to receive includes means to provide a weighted sum of the respective received tap signals.

5. The quadrature phase shift keying receiver of claim 2, wherein said error loop means includes a second order loop filter.

6. The quadrature phase shift keying receiver of claim 1, wherein said data demodulator further comprises data detector means providing a dibit output according to the output of said quadrature filter; and data correction means, receiving the output of said data detector means, producing a corrected data output signal.

7. The quadrature phase shift keying receiver of claim 6, wherein said data correction means comprises a second order data loop and a differential phase decoder.

8. The quadrature phase shift keying receiver of claim 1, wherein said receiver is implemented with digital logic elements.

9. A quadrature phase shift keying receiver, including:

means for sampling a quadrature phase shift keyed signal according to a sample clock signal;

quadrature filter means receiving the output of the means for sampling and providing in-phase, and quadrature outputs, further including means for providing the arithmetic square of an in-phase signal;

means for providing the arithmetic square of a quadrature signal;

means for adding the respectively arithmetic squares of the in-phase and quadrature signal, providing an error output;

error loop means receiving said error output from the quadrature filter means and providing an error signal;

sample clock means for providing said sample clock signal to said means for sampling, the position of which being adjusted according to said error signal; and data demodulator means for providing a data signal according to the in-phase output and the quadrature output of said quadrature filter means.

10. A quadrature phase shift keying receiver, including:

means for sampling a quadrature phase shift keyed signal according to a sample clock signal;

quadrature filter means receiving the output of the means for sampling and providing in-phase, quadrature, and error outputs;

error loop means receiving said error output from the quadrature filter means and providing an error signal;

sample clock means for providing said sample clock signal to said means for sampling, the position of which being adjusted according to said error signal; and data demodulator means for providing a data signal according to the in-phase output and the quadrature output of said quadrature filter means, wherein said error loop means further includes upper threshold means receiving the output signal from said second order loop filter, and producing a signal when said upper threshold is exceeded;

lower threshold means receiving the output signal from said second order loop filter producing a signal when said lower threshold is exceeded;

clock means producing a periodic pulse signal; and presettable counter means producing said sample pulse when an integer number of clock pulses are received, said integer being adjusted in response to said upper and lower threshold means output.

* * * * *

UNITED STATES PATENT AND TRADEMARK OFFICE
CERTIFICATE OF CORRECTION

PATENT NO. : 4,606,051  (Page 1 of 2)

DATED : August 12, 1986

INVENTOR(S) : Steven B. Crabtree; Harry Yedid; James B. Sherman

It is certified that error appears in the above-identified patent and that said Letters Patent is hereby corrected as shown below:

Column 1, line 36, "procesors" should read --processors--

Column 3, line 61, "are shown" should read --as shown--

Column 5, line 16, "results is" should read --result is--

Column 6, line 48, "at 5" should read --of 5--

Column 7, line 32, "FIG. 6. the" should read --FIG. 6. The--
         line 41, "return" should read --returns--

Column 8, lines 12-13, "returns    should read
                the background"

--returns to
                     the background--

Column 8, line 17, "provides a diagnostic" should read --provides diagnostic--
         line 19, "conditon" should read --condition--

Column 9, line 7, "contstant" should read --constant-

Column 9, line 9, "adjusting" should read --adjusted--

Column 9, lines 42-43, "If the test at step 1504," should read --If the test at step 1504 fails,--

UNITED STATES PATENT AND TRADEMARK OFFICE
CERTIFICATE OF CORRECTION

PATENT NO. : 4,606,051  (Page 2 of 2)

DATED : August 12, 1986

INVENTOR(S) : Steven B. Crabtree; Harry Yedid; James B. Sherman

It is certified that error appears in the above-identified patent and that said Letters Patent is hereby corrected as shown below:

Column 10, line 20, "at a seven-tap" should read --with a seven-tap--

Column 11, line 18, "means for" should read --means to--

Signed and Sealed this

Twenty-second Day of November, 1988

Attest:

DONALD J. QUIGG

Attesting Officer

Commissioner of Patents and Trademarks